W. C. MOOR.
AERO ANGLE METER OR LEVEL REGISTER.
APPLICATION FILED DEC. 9, 1918.
1,380,999.
Patented June 7, 1921.
2 SHEETS—SHEET 1.
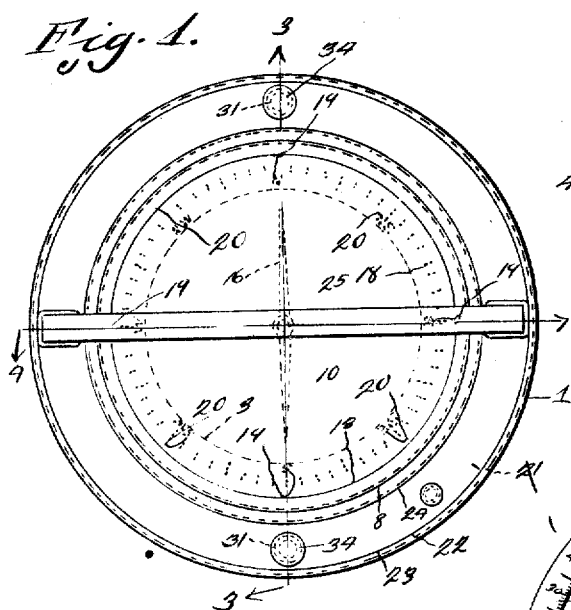
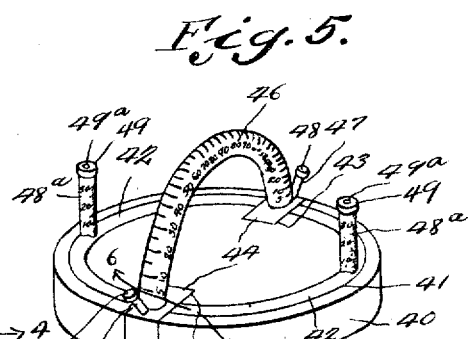
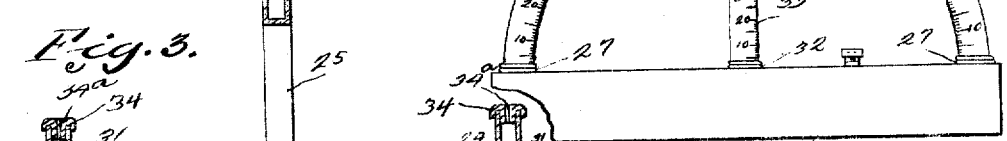
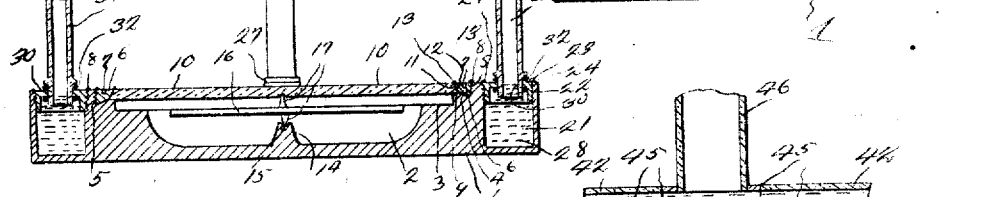
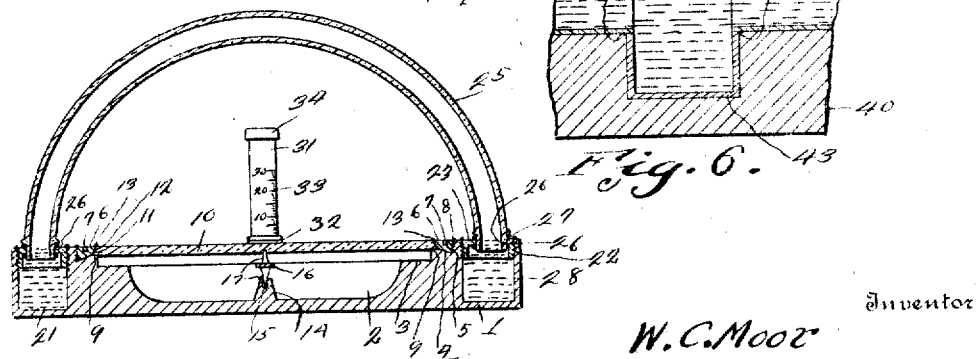
Inventor
W. C. Moor
Witnesses W. C. MOOR.
AERO ANGLE METER OR LEVEL REGISTER.
APPLICATION FILED DEC. 9, 1918.
1,380,999.
Patented June 7, 1921.
2 SHEETS—SHEET 2.
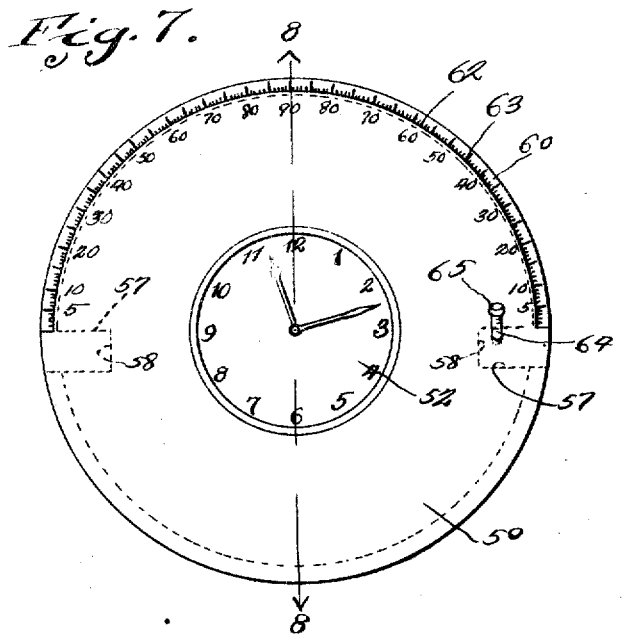
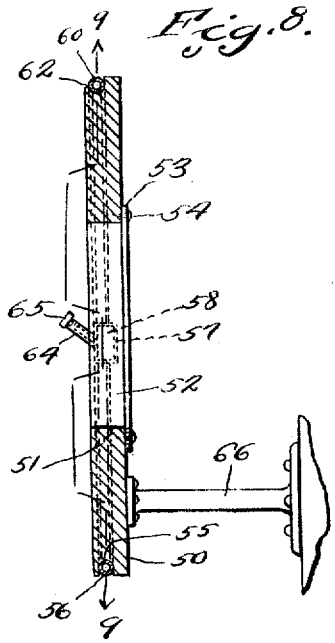
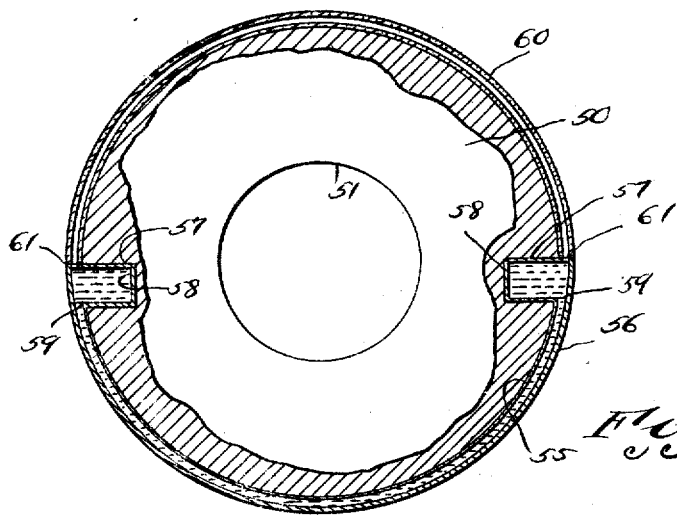
Inventor
W. C. Moor

UNITED STATES PATENT OFFICE.

WILLIAM CHRISTOPHER MOOR, OF HAVILAH, ONTARIO, CANADA.

AERO ANGLE-METER OR LEVEL-REGISTER.

1,380,999.  Specification of Letters Patent.  Patented June 7, 1921.

Application filed December 9, 1918. Serial No. 265,862.

*To all whom it may concern:*

Be it known that I, WILLIAM CHRISTOPHER MOOR, subject of the King of Great Britain, residing at Havilah, in the Province of Ontario, Dominion of Canada, have invented a new and useful Aero Angle-Meter or Level-Register; and I do hereby declare the following to be a full, clear, and exact description of the invention, such as will enable others skilled in the art to which it appertains to make and use the same.

This invention relates to an improved aero-angle meter or level register, and an object of the invention is to provide a simple, efficient and practical device of this kind, particularly adapted for use on airplanes, and is so constructed as to instantly respond and indicate any change of angle or position of the airplane, during its flight. For instance this device will indicate what angle the airship is assuming when ascending or descending, as well as indicating the side tilt or angle of the craft.

A further object of the invention is the provision of a device of this kind that can be used in the field, for indicating the levels or bearings and elevations, and can also be used for leveling any object, beam or the like.

It is obvious that this angle meter or level register or indicator may be made of any suitable material, and any desired shape, and of various dimensions, particularly suitable for use on airplanes.

A further object of the invention is to provide an aero-angle meter having combined therewith a conventional form of marine compass, whereby the aviator may easily steer the craft, and at the same time be able to ascertain the angle assumed by the craft during its course.

A further object of the invention is to provide a casing having an annular reservoir for the reception of a non-freezing fluid or liquid, adapted to rise and fall in the graduated glass tubes, extending upwardly from the reservoir adjacent the most important points of the compass, for instance, north, south, east and west, so as to indicate the angle of the craft, to either side, or fore and aft.

In practical fields the details of construction may necessitate alterations falling within the scope of what is claimed.

The invention comprises further features and combination of parts as hereinafter set forth, shown in the drawings and claimed.

In the drawings:—

Figure 1 is a plan view of the improved aero-angle meter or level indicator instrument.

Fig. 2 is a view in front elevation.

Fig. 3 is a sectional view on line 3—3 of Fig. 1.

Fig. 4 is a sectional view on line 4—4 of Fig. 1.

Fig. 5 is a perspective view of a modified form of angle meter.

Fig. 6 is a detail sectional view of the same.

Fig. 7 is a front elevation of another modified form of angle meter.

Fig. 8 is a sectional view on line 8—8 of Fig. 7.

Fig. 9 is a sectional view on line 9—9 of Fig. 8.

Referring more especially to the drawings, 1 designates a casing, which is provided with a central dished portion 2 and a ledge or shoulder 3, surrounding and adjoining the wall of the dished portion or depression. The upper face of the casing 1 is provided with an annular recess 4, the wall of which is threaded at 5. An annular ring 6 is threaded into the recess 4 by means of the threads 5, by using a spanner so as to engage the notches 7. After the ring 6 is threaded into place, the threaded joint may be made air tight in any suitable manner, as by brazing as indicated at 8. The casing has an annular shoulder 9, on which a disk crystal may rest. This disk crystal 10 has a beveled marginal edge 11, which is engaged by the corresponding bevel wall 12 of the ring 6. The joint between the bevel walls of the ring and the crystal may be made air tight as by cement as indicated at 13, thereby rendering the dished portion or depression 2 airtight. Rising upwardly from the center of the dished portion or depression 2 is a suitable post 14 provided with the usual ruby bearing 15, such as used in marine compasses. A conventional form of magnetic needle 16, such as used in marine compasses is provided, and its bearing points 17, which are axially disposed supports the pointer. The upper bearing point 17 has a ground bearing in the crystal, while the lower bearing point engages the ruby bearing 15, as in marine compasses. The ledge or shoulder 3 of the casing is provided with graduations 18 similar to those used in compasses for navigation, to be coöperated with by the needle or pointer, for indicating the course of the craft. The ledge or shoulder 3 is also provided with indications 19 and 20 representing north, south, east and west, northeast, northwest, southeast and southwest. The casing 1 has an annular chamber 21, the upper portion of the wall of which is threaded at 22, to be engaged by the threaded flange ring 23. The threaded joints between the flanged ring and the walls of the chamber 21 are made fluid tight and airtight in any suitable manner as by brazing or the like as indicated at 24. A semi-circular hollow glass tube 25 is supplied, the same being rectangular in cross section preferably. The end portions of this tube 25 are fitted and cemented into openings 26 of the flange ring 23, as indicated at 27. It is to be noted that the end portions of this tube connect to the flanged ring immediately adjacent and opposite the east and west indications of the compass, and it is obvious that the interior of the tube 25 is in communication with the chamber 21, which is filled with any suitable non-freezing fluid or liquid as shown at 28. The front face of the semi-circular tube 25 preferably near the end portions, is provided with suitable graduations 29, for indicating the level of the fluid or liquid as it rises and falls in either end of the tube for indicating the side tilt or the angle of the aircraft, either east or west. The flanged ring at points immediately adjacent and opposite the north and south indications of the compass is provided with diametrically opposite openings 30, for the reception of perpendicular hollow glass tubes 31, the interiors of which are in communication with the chamber 21. Where the glass tubes 31 engage through the openings 30, the joints are suitably cemented or otherwise sealed as at 32, in order to provide airtight joints. These tubes 31 are preferably cylindrical, and their front portions are provided with graduations 33, for indicating the level of the fluid or liquid as it rises and falls therein, so as to indicate the tilt or the angle of the aircraft, fore or aft. Suitable caps or closures 34 made of any suitable material preferably rubber or metal are fitted into and over the upper ends of the tubes 31, and by means of these caps the air in the reservoir or chamber 21 may be regulated if necessary, there being apertures 34$^a$ in the caps 34 forming air vents to permit air to escape as the water or liquid rises in the tubes. This instrument may be placed on the aircraft rigidly, as by means of brackets or the like (not shown), or by any other suitable means, and when properly placed every movement or angle to either side, fore and aft will be indicated on the graduations of the tubes. It will be obvious that the chamber or reservoir 21 should be filled with the liquid or fluid exactly to and flush with the upper surface of the ring 23.

In Fig. 5 a modification of the structure shown in Figs. 1 to 4 inclusive is discussed. This modification comprises a circular base, which may be constructed of any suitable material, and formed in the upper face of the base 40 is an annular groove 41, which may be any suitable shape in cross section preferably as shown. Countersunk in the groove 41, are semi-circular tubes 42, the upper faces of which are flush with the upper face of the base 40. These tubes 42 may be constructed of any suitable material, metal or glass preferably the latter, and formed in the base diametrically opposite each other fore and aft are recesses 43, for the reception of reservoirs 44, which may be constructed of any suitable material, metal or glass preferably the latter and to which the tubes 42 are connected communicatively as designated at 45. These reservoirs and the tubes 42 are filled with any suitable fluid, of a kind that will not freeze. Rising upwardly from the reservoirs and communicatively connected thereto fore and aft is a semi-circular glass tube 46, which is graduated fore and aft to the center in degrees, from zero to 90. It is obvious that when the craft having an instrument of this kind descends or ascends, the fluid in the reservoirs will rise in the tube 46, either fore or aft, thereby indicating the angle on which the craft is traveling. The reservoirs at points where the tube 46 connects thereto are provided with filling tubes 47 having caps 48. Rising upwardly from and communicatively connected to the tubes 42 diametrically opposite each other and at right angles to the tube 46, are upright tubes 48$^a$, provided with cemented or sealed caps 49, which are provided with vent apertures 49$^a$ to permit air to escape as the liquid rises in the tubes 48$^a$. The tubes 48$^a$ are graduated, so as to indicate the level of the fluid should the craft tilt to either side. The instrument in Fig. 5 broadly speaking is on the same principle as the structure in Figs. 1 to 4 inclusive, but in so far as specific construction is concerned there exists specific detail differences. If desired the instrument in Figs. 1 to 4 inclusive may be used in a manner similar to the use of the instrument in Fig. 5. That is, the tube 25 may be employed to indicate the angle of the craft when ascending or descending. In this case the tube 25 should be graduated to ninety degrees fore and aft. However, the graduations of this kind are not entirely necessary.

Another form of angle meter is disclosed in Figs. 7, 8 and 9, and this form of angle meter comprises a circular plate 50, which may be constructed of any suitable material preferably wood, and is provided with a concentric opening 51, for the reception of a time piece casing 52, which is secured in the opening 51 by the marginal flange 53 and the securing means 54. The time piece casing may be inserted in the opening from the rear. The circular plate 50 is provided on its marginal edge with a groove 55, the lower half of which receives a semi-circular metallic tube 56. The circular plate 50 at diametrically opposite points fore and aft is provided with cavities or recesses 57, for the reception of the reservoir casings 58, constructed of any suitable material preferably metal, and to which the metallic tube 56 is communicatively connected as shown at 59. Arranged in the upper half of the annular groove 55 is a semi-circular tube 60, constructed of any suitable material preferably glass. The ends of this tube 60 are connected to the reservoir casings communicatively, in any suitable manner such as by cementing or the like as at 61. This glass tube 60 is graduated from each end fore and aft to ninety degrees in the center. A portion of one of the walls of the upper half of the groove 55 is cut away as shown at 62 clearly shown in Fig. 8, so that the graduations 63 may be easily observed. By means of the graduations, the level of the fluid in the tube 56 and the reservoirs as it rises in the tube 60, either fore or aft, should the craft ascend or descend may be indicated thereby indicating the angle on which the craft is traveling. One of the reservoirs is provided with a filling tube 64 having a cap 65. One of the instruments shown in Figs. 7, 8 and 9 may be employed to indicate the angle on which the craft is traveling while ascending or descending, while another instrument of a similar kind may be employed to indicate the side tilt of the craft. However, in either case the instrument may be supported at any location on the craft by any suitable means, for instance such as by a support 66 shown in Fig. 6.

The invention having been set forth what is claimed as new and useful is:—

1. In an aero-angle meter, the combination with a casing having an annular non-freezing fluid containing chamber, of a marine compass carried by the casing, a semi-circular hollow transverse tube, having its opposite ends connected to the top wall of the chamber and in communication therewith at points adjacent the diametrically opposite east and west indications of the compass, said tube adjacent its ends having graduations indicating the level of the fluid as it rises and falls in either end of the tube, whereby the degree of angle of the craft to either side may be indicated, perpendicular hollow transparent tubes connected to the top wall of the chamber at points adjacent the north and south indications of the compass and being in communication with said chamber, said last named tubes having graduations for indicating the level of the fluid as it rises and falls, whereby the angle of tilt of the craft fore and aft may be indicated.

2. In an aero-angle meter, the combination with a casing having an annular chamber adapted for the reception of a non-freezing fluid, of a semi-circular transparent tube connected to the top wall of the chamber at diametrically opposite side points of the casing and in communication with the chamber, the end portions of the tube having graduations for indicating the level of the fluid as it rises and falls in the tube at either end, whereby the side angle of the craft may be indicated, and perpendicular transparent tubes connected to the top wall of the chamber fore and aft at right angles to the semi-circular tube and in communication with the chamber, closures for the upper ends of the perpendicular tubes, said perpendicular tubes having graduations to indicate the level of the fluid as it rises and falls, whereby the angle of the craft fore and aft may be indicated.

3. In an aero-angle meter, the combination with a casing having a central dished portion or depression and provided with a ledge adjoining said depression, said ledge having compass graduations and indications representing north, south, east and west, a crystal cover for the dished portion or depression, a compass needle mounted in bearings of the crystal and the bottom of the dished portion or depression, said casing having an annular chamber adapted to contain a non-freezing fluid, of a semi-circular hollow transverse tube, having its opposite ends connected to the top wall of the chamber and in communication therewith at points adjacent the east and west indications of the compass, said tube adjacent its ends having graduations indicating the level of the fluid as it rises and falls in either end of the tube, whereby the degree of angle of the craft to either side may be indicated, perpendicular hollow transparent tubes connected to the top wall of the chamber adjacent the north and south indications of the compass and being in communication with said chamber, said last named tubes having graduations for indicating the level of the fluid as it rises and falls, whereby the angle of the craft fore and aft may be indicated.

In testimony whereof I have signed my name to this specification in the presence of two subscribing witnesses.

WILLIAM CHRISTOPHER MOOR.

Witnesses:
W. F. CLARK,
J. C. ANDERSON.